United States Patent Office 3,422,064
Patented Jan. 14, 1969

3,422,064
AROMATIC POLYIMIDE PREPARATION
Walter George Gall, Wilmington, Del., assignor to E. I. du Pont de Nemours and Company, Wilmington, Del., a corporation of Delaware
No Drawing. Filed Jan. 27, 1965, Ser. No. 428,564
U.S. Cl. 260—47                                      6 Claims
Int. Cl. C08g 20/32

---

ABSTRACT OF THE DISCLOSURE

Polyimides are formed directly from an aromatic dianhydride and an aromatic amine by reacting the dianhydride and the diamine at high temperature ranging from 190° C. to 300° C. A molding powder is formed.

---

This invention relates to the direct production of aromatic polyimides from aromatic diamines and aromatic dianhydrides.

Known processes for the production of aromatic polyimides are two step processes, for example formation of polyamide acid, followed by conversion of the polyamide acid to polyimide. It has now been found that aromatic polyimides may be formed directly from the diamine and the dianhydride by reacting these monomers at a temperature between 190° C. and 300° C. in the presence of a tertiary amine catalyst and a solvent for the monomers. The monomers should be present in the reaction mixture in approximately equal molar amounts.

The monomers polymerized according to the process of the present invention have the following general formulas (1)                 $H_2N—R'—NH_2$ and (2) 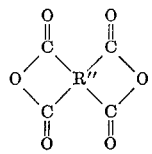

and where R' and R'' are inert aromatic radicals. R' and R'' may be radicals having the formula

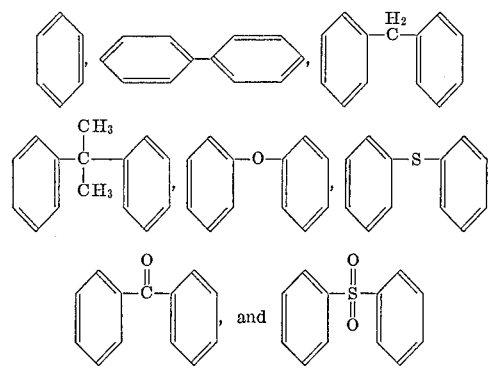

These inert radicals may be substituted with other inert monovalent radicals. Specific monomers containing the above radicals include: meta and para phenylenediamine, 4,4'-diaminodiphenyl, 4,4'-diaminodiphenylmethane, 2,2-bis(4-aminophenyl)propane, 4,4'diaminodiphenyl ether, 4,4' - diaminodiphenylsulfide, 4,4'-diaminobenzophenone, 3,3' - diaminodiphenylsulfone, 4,4'-diaminodiphenylsulfone, pyromellitic dianhydride, 3,3',4,4'-diphenyltetracarboxylic dianhydride, 2,2',3.3'-diphenyltetracarboxylic dianhydride, bis(3,4 - dicarboxyphenyl)methane dianhydride, 2,2'-bis(3,4-dicarboxyphenyl)propane dianhydride, bis(3,4-dicarboxyphenyl)sulfone dianhydride, bis(3,4-dicarboxyphenyl)ether dianhydride, and bis(3,4-dicarboxyphenyl)sulfide dianhydride. The dianhydride monomers used in the process of this invention have their 4 carbonyl groups attached to different carbon atoms and the carbon atoms to which each pair of carbonyl groups that form an anhydride group are attached, are directly adjacent in the R'' group, thus providing a 5-membered ring, i.e.,

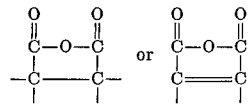

In order for the monomers to react readily it is necessary that they be dissolved. Since the temperature at which the reaction takes place is within the range of 190° to 300° C., it is necessary that at least one of the monomers be dissolved in a high boiling solvent that is inert in the reaction. Suitable solvents include, for example, the high boiling aromatic ethers such as diphenyl ether, alkyl substituted diphenyl ethers in which each alkyl group has 1–6 carbon atoms, and resorcinol dimethyl ether, dibenzofuran, and dibenzo-p-dioxin. One of the monomers may be dissolved in an inert solvent whose boiling point is less than 190° C. Suitable solvents thus include the N,N-dialkylcarboxyamide compounds, such as N,N-dimethylformamide, N,N-dimethylacetamide, N,N,-diethylformamide, N,N,-diethylacetamide, as well as N-methylcaprolactam, dimethylsulfoxide, N-methyl-2-pyrrolidone, tetramethylurea, pyridine, dimethylsulfone, hexamethylphosphoramide, tetramethylenesulfone, formamide, N-methylformamide and butyrolactone.

A tertiary amine catalyst is necessary for the polymerization reaction to proceed effectively. Suitable catalysts include pyridine, trimethylamine, triethylamine, tri-n-propylamine, tri-n-butylamine, tri-isobutylamine, tri-amylamine, N,N-dimethylbenzylamine, N,N-dimethyldodecylamine and triethylenediamine. The amine catalyst should be present in the reaction mixture at a concentration of about 0.1 to 4 equivalents of amine per equivalent of diamine. Since the tertiary amine catalysts generally have boiling points lower than the reaction temperature, it is preferable not to add the catalysts until the reaction is to take place. One method for catalyst addition is to form a solution of dianhydride and a separate solution of diamine. One of the solutions is heated to reaction temperature. To the other solution is added the tertiary amine. The solutions are then mixed rapidly. The solvent for both solutions may be a high boiling inert solvent; however, only the solution initially heated to reaction temperature must be a high boiling inert solvent.

The products formed by the process of this invention are finely divided high surface area polyimides; these products can be made to coalesce at temperatures below the crystalline melting point to form solid homogeneous objects. The finely divided high surface area polyimides may be coalesced at temperatures from 200° C. to 500° C. and at pressures of from 2000 to about 30,000 p.s.i. The force necessary to break coalesced products by flexure or in tension can be used as a criterion of integrity and quality of the coalesced product and, therefore, the usefulness of the original finely-divided polyimide.

Since the reaction of the monomers is extremely rapid, the process of this invention readily lends itself to continuous operation. Thus, the monomers dissolved in the solvents may be fed in approximately equal molar amounts, at least one at reaction temperature, through different branches of a mixing T, the monomers meeting and rapidly reacting in the trunk of the T, a slurry of the polyimide product then being continuously removed and separated from the solvent.

In the following examples which illustrate the inven-

EXAMPLE I

A solution of 21.813 g. of pyromellitic dianhydride in 100 ml. of diphenyl ether in a 1 liter flask was heated to 243° C. A solution of 20.024 g. of pure 4,4'-diaminodiphenyl ether and 4.0 g. of anhydrous triethylamine in 100 ml. of highly purified N,N-dimethylacetamide was heated to 90° C. and was added rapidly (1 second) to the vigorously stirred phenyl ether solution in the open flask at 240° C. There was much foaming from the steam produced and the yellow powder which infrared analysis subsequently confirmed to be polyimide, precipitated as the reactants were being mixed. Stirring was continued for two minutes before separation of the product by filtration through a glass filter. The product was then washed three times with 750 ml. of acetone by dispersing with a blender and filtering; it was then dried at about 150° C. for 30 minutes in a vacuum oven and then heat treated under nitrogen for 8 hours at 300° C. Coalescence of the powder was carried out at 490° C. using 20,000 p.s.i. for 5 minutes. Portions of 0.080" thickness chips so produced could not be broken by hand. The powder crystallinity index was 43%.

EXAMPLE II

A solution of 32.224 g. of 3,3',4,4'-benzophenone tetracarboxylic dianhydride in 100 ml. of diphenyl ether in a 500 ml. flask was heated to 250° C. A solution of 20.024 g. of 4,4'-diaminodiphenyl ether and 5 ml. of anhydrous triethylamine in 100 ml. N,N-dimethylacetamide was heated to 90° C. and was added rapidly to the vigorously stirred phenyl ether solution in the open flask. There was much foaming from the steam produced and the yellow powder which infra red analysis subsequently confirmed to be polyimide, precipitated as the reactants were being mixed. Stirring was continued for two minutes before separation of the product by filtration on a sintered glass filter. After four acetone washes, as per Example I, the product was dried and heat treated in a partial vacuum under nitrogen for 16 hours at 300° C. Coalescence of the powder was carried out at 400° C. using 5800 p.s.i. for 20 minutes. The chip was stiff, strong, hard and had a tensile strength of 18,100 p.s.i. and elongation of 6.7%. The powder crystallinity index was 32%.

EXAMPLE III

A solution of 21.8 g. of pyromellitic dianhydride in 100 ml. of diphenyl ether in a 1 liter flask was heated to 240° C. A solution of 19.8 g. of 4,4'-diaminodiphenylmethane and 5 ml. of triethylamine in 100 ml. of N,N-dimethylacetamide was heated to 90° C. and was added rapidly to the vigorously stirred phenyl ether solution in the open flask. There was much foaming from the steam produced and the yellow powder which infrared analysis subsequently confirmed to be polyimide, precipitated as the reactants were being mixed. Stirring was continued for two minutes before separation of the product by filtration. After four acetone washes, as per Example I, the product was dried and heat treated in a partial vacuum under nitrogen for 16 hours at 300° C. Coalescence of the powder was carried out at 420° C. using 4200 p.s.i. for 10 minutes followed by 16,500 p.s.i. for 10 minutes. Portions of 0.105" thickness chips so produced could not be broken by hand. The powder crystallinity index was 39%.

EXAMPLE IV

The procedure of Example III was followed using 32.2 g. of 3,3',4,4'-benzophenonetetracarboxylic acid dianhydride and 19.8 g. of 4,4'-diaminodiphenyl methane as the monomers. Coalescence of the heat-treated yellow powder was carried out at 400° C. and 6000 p.s.i. for 20 minutes. The stiff, strong, hard chip had a tensile strength of 18,400 p.s.i. and elongation of 8.4%. The powder crystallinity index was 45%.

EXAMPLE V

The procedure of Example III was followed using 32.2 g. of 3,3',4,4'-benzophenonetetracarboxylic dianhydride and 10.8 g. of meta-phenylenediamine as the monomers. Coalescence of the heat-treated orange-yellow powder was carried out at 410° C. and 6000 p.s.i. for 20 minutes. The chip was black, stiff and hard but somewhat brittle. The powder crystallinity index was 55%.

EXAMPLE VI

A solution of 22.4 g. of diazabicyclo(2,2,2)octane in 200 ml. of diphenyl ether in a 500 ml. flask was heated to 220° C. A mixture of 21.8 g. solid pyromellitic dianhydride and 20.0 g. solid 4,4'-diaminodiphenyl ether was made with a paint shaker and added to the vigorously stirred diphenyl ether solution in the open flask over a 5 minute period. Stirring was continued for 3 minutes before separation of the orange polyimide powder. After four acetone washes, the product was dried and heat treated under nitrogen for 16 hours at 300° C. The powder turned black, presumably from decomposition of residual diazabicyclo(2,2,2)-octane catalyst. Coalescence of the powder at 460° C. and 20,000 p.s.i. for 10 minutes resulted in black pieces which were hard and stiff, but brittle.

I claim:
1. A process for the direct production of aromatic polyimides which comprises reacting approximately equal molar amounts of at least one diamine having the formula $H_2N$—$R'$—$NH_2$ and at least one tetracarboxylic dianhydride having the formula

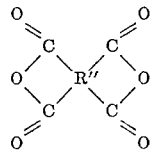

where R' and R" are carbocyclic aromatic radicals, each pair of carbonyl groups which form the anhydride groups being attached to directly adjacent carbon atoms in the R" radical, in the presence of a high boiling inert solvent for at least one of the reactants and a tertiary amine catalyst at a temperature in the range of 190° C. to 300° C. and recovering a finely-divided, high-surface area, aromatic polyimide.

2. The process of claim 1 in which R' and R" are selected from the class consisting of inert carbocyclic aromatic radicals having the formula

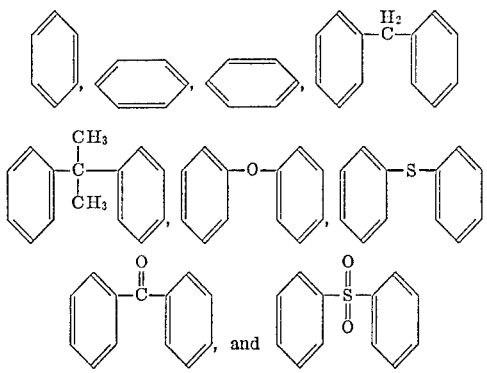

3. The process of claim 2 in which the high boiling inert solvent is a carbocyclic aromatic ether.

4. The process of claim 3 in which the tertiary amine catalyst is selected from the class consisting of pyridine, trimethylamine, triethylamine, tri-n-propylamine, tri-n-butylamine, tri-isobutylamine, triamylamine, N,N-dimethylbenzylamine, N,N-dimethyldodecylamine and triethylenediamine.

5. A process for the production of aromatic polyimides which comprises forming a first solution of carbocyclic aromatic diahydride, forming a second solution of carbocyclic aromatic diamine, said first solution and said second solution containing approximately equal molar amounts of the solute, the solvent for at least one of said solutions being a high boiling carbocyclic aromatic ether, heating one of said solutions having as solvent a high boiling carbocyclic aromatic ether to a temperature within the range of 190° C. to 300° C., adding tertiary amine catalyst to the other solution, then mixing rapidly the two solutions together, and recovering a finely-divided high-surface area, aromatic polyimide.

6. The process of claim 5 in which the solvent for one of the solutions is at least one member selected from the class consisting of N,N-dimethylformamide, N,N-dimethylacetamide, N,N-diethylformamide, N,N-diethylacetamide, N,N-dimethylmethoxyacetamide, N-methylcaprolactam, N-methyl-2-pyrrolidone, tetramethylurea, pyridine, dimethylsulfone, hexamethylphosphoramide, tetramethylenesulfone, formamide, N-methylformamide, and butyrolactone.

References Cited

UNITED STATES PATENTS

| | | | |
|---|---|---|---|
| 2,710,853 | 6/1955 | Edwards et al. | 260—78 |
| 3,179,631 | 4/1965 | Endrey | 260—78 |
| 3,179,632 | 4/1965 | Hendrix | 260—78 |
| 3,179,633 | 4/1965 | Endrey | 260—78 |

FOREIGN PATENTS 570,858  7/1954  Great Britain.

WILLIAM H. SHORT, *Primary Examiner.*

F. D. ANDERSON, *Assistant Examiner.*

U.S. Cl. X.R.

260—65, 78